US009480991B2

(12) United States Patent
Baym et al.

(10) Patent No.: US 9,480,991 B2
(45) Date of Patent: Nov. 1, 2016

(54) RADIOFREQUENCY PARTICLE SEPARATOR

(71) Applicant: Elwha LLC, Bellevue, WA (US)

(72) Inventors: Michael H. Baym, Cambridge, MA (US); Terry Briggs, Lone Tree, CO (US); Clark J. Gilbert, Denver, CO (US); W. Daniel Hillis, Encino, CA (US); Roderick A. Hyde, Redmond, WA (US); Muriel Y. Ishikawa, Livermore, CA (US); Jordin T. Kare, Seattle, WA (US); Conor L. Myhrvold, Bellevue, WA (US); Nathan P. Myhrvold, Bellevue, WA (US); Tony S. Pan, Cambridge, MA (US); Clarence T. Tegreene, Bellevue, WA (US); Charles Whitmer, North Bend, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 869 days.

(21) Appl. No.: 13/651,102

(22) Filed: Oct. 12, 2012

(65) Prior Publication Data
US 2014/0102947 A1    Apr. 17, 2014

(51) Int. Cl.
*B03B 1/02* (2006.01)
*B03B 1/04* (2006.01)
*B01D 21/00* (2006.01)

(52) U.S. Cl.
CPC .............. *B03B 1/02* (2013.01); *B01D 21/0009* (2013.01); *B03B 1/04* (2013.01)

(58) Field of Classification Search
CPC ........... B03C 1/005; B03C 1/23; B03C 1/32; B03C 2201/20; B03C 2201/22; B03B 1/00; B03B 1/02; B03B 1/04; B03B 1/06; C02F 1/302; C02F 1/484; C02F 1/485; C02F 1/487; C02F 2201/483; C02F 2201/486; C22B 4/08; C22B 1/10; B01J 19/129; B01J 19/126; B01J 2219/00141; B01J 2219/00148; B01D 21/0009
See application file for complete search history.

(56) References Cited

U.S. PATENT DOCUMENTS 3,261,959 A * 7/1966 Moe ..................... C21B 13/08
                                                    159/DIG. 26
4,013,558 A * 3/1977 Rosenberg ................ A61L 2/12
                                                    210/149

(Continued)

FOREIGN PATENT DOCUMENTS

JP        2005-111419 A       4/2005

OTHER PUBLICATIONS

Lovas et al.; "The Application of Microwave Energy in Mineral Processing—a Review"; Acta Montanistica Slovaca; 2011; pp. 137-148; vol. 16, No. 2.

(Continued)

*Primary Examiner* — David C Mellon
(74) *Attorney, Agent, or Firm* — Foley & Lardner LLP

(57) ABSTRACT

An apparatus for separating a mineral from a liquid including a housing and a fluid having a mineral bearing particle and contained within the housing. The apparatus further includes a generator configured to apply a radio-frequency electromagnetic field to the mineral bearing particle. The field produces a temperature increase within a portion of the mineral bearing particle and the mineral bearing particle transfers heat into the fluid, the heated fluid imposing motion-inducing forces on the particle.

37 Claims, 4 Drawing Sheets

(56) References Cited

U.S. PATENT DOCUMENTS

| | | |
|---|---|---|
| 4,077,871 A | 3/1978 | Kumar et al. |
| 4,388,179 A | 6/1983 | Lewis |
| 5,161,695 A * | 11/1992 | Roos .................. B03B 1/00 209/11 |
| 5,368,171 A * | 11/1994 | Jackson ............. B01J 19/126 134/1 |
| 7,571,814 B2 | 8/2009 | Birken |
| 8,469,196 B2 * | 6/2013 | Birken .................. B03C 1/005 209/11 |
| 2004/0060387 A1 * | 4/2004 | Tanner-Jones ......... C22B 5/02 75/10.2 |
| 2005/0092657 A1 | 5/2005 | Birken |
| 2006/0034733 A1 | 2/2006 | Ferren et al. |
| 2007/0267351 A1 | 11/2007 | Roach et al. |
| 2010/0219105 A1 | 9/2010 | White et al. |

OTHER PUBLICATIONS

PCT International Search Report; International App. No. PCT/US2013/064267; Jul. 15, 2014; pp. 1-3.

Zvegintsev et al.; "Investigation Into Processes of Flocculation of Finely Divided Minerals by Radio-Frequency Method"; Journal of Mining Science, 1997; pp. 176-178; vol. 33, No. 2; Plenum Publishing Corporation.

* cited by examiner

RADIOFREQUENCY PARTICLE SEPARATOR

BACKGROUND

Mining operations remove aggregate ore from an in-ground deposit and process the loose aggregate ore to remove metals, coal, and other minerals. Ore removed from the ground includes particles of the target material but may also include various other, secondary materials. Such secondary materials may include rock, soil, and other minerals. In order to produce a pure sample of the target material, the secondary material must be removed from the target material sample.

Traditional methods for removing secondary material from a target material involve a chemical process and one or more finishing steps. The finishing steps often fail to fully remove the secondary material from the target material. By way of example, finishing steps may include the size or weight dependent processes of frothing, filtering, and panning. Frothing uses chemicals and large bubbles to chemically separate target material. Filtering machines rely on a fluid containing the target material and secondary material and pass the fluid through one or more filters. The filters are generally fibrous and vary in precision from course to fine. After the fluid is passed through, particles of the same size are trapped within the filter regardless of whether the particles are target material or secondary material. Given the need for a pure target material final product, trapped filter material may be thereafter panned. While panning separates target material from secondary material, panning is very time consuming. Despite these deficiencies, frothing, filtering and panning remain the primary methods used for removing target material from a fluid containing target material and secondary materials.

SUMMARY

One exemplary embodiment relates to an apparatus for separating a mineral from a liquid including a housing and a fluid having a mineral bearing particle and contained within the housing. The apparatus further includes a generator configured to apply a radio-frequency electromagnetic field to the mineral bearing particle. The field produces a temperature increase within a portion of the mineral bearing particle and the mineral bearing particle transfers heat into the fluid, the heated fluid imposing motion-inducing forces on the particle.

Another exemplary embodiment relates to an apparatus for separating a mineral bearing particle from a fluid including a housing and a fluid having a mineral bearing particle and contained within the housing. The apparatus further includes a generator configured to apply a non-uniform radio-frequency electromagnetic field to the mineral bearing particle. The field induces a propulsion force that moves the mineral bearing particle within the fluid.

Still another exemplary embodiment relates to a mobile apparatus for separating a mineral bearing particle from a fluid. The mobile apparatus includes a housing configured to float at a surface of the fluid and a driver configured to create relative movement between the housing and the fluid. The mobile apparatus further includes a generator configured to apply a radio-frequency electromagnetic field to the fluid. The field increases the temperature of a mineral bearing particle contained within the fluid to a boiling point of the fluid whereby the mineral bearing particle transfers heat into the fluid.

Yet another exemplary embodiment relates to a method for separating a mineral bearing particle from a fluid. The method includes providing a housing, providing a fluid contained within the housing, the fluid containing a mineral bearing particle, applying a radio-frequency electromagnetic field to the mineral bearing particle using a generator, and increasing the temperature of a portion of the mineral bearing particle with the field, wherein the mineral bearing particle transfers heat into the fluid, the heated fluid imposing motion-inducing forces on the mineral bearing particle.

Yet another exemplary embodiment relates to a method for separating mineral bearing particle from a fluid. The method includes providing a housing, providing a fluid contained within the housing, the fluid containing at least one mineral bearing particle, applying a non-uniform radio-frequency field to the mineral bearing particle using a generator, and moving the mineral bearing particle within the fluid with an propulsion force induced by the field.

The invention is capable of other embodiments and of being carried out in various ways. Alternative exemplary embodiments relate to other features an combinations of features as may be generally recited in the claims.

BRIEF DESCRIPTION OF THE DRAWINGS

The invention will become more fully understood from the following detailed description taken in conjunction with the accompanying drawings wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

RF separators are intended to provide an efficient replacement to traditional separation equipment. Such RF separators receive a fluid containing particles largely separated from rock through polymerization and raise the temperature of target material to raise the particles within a fluid. Such target particles may also be raised magnetically. Various conditions are controlled to ensure that secondary material is not raised within the fluid. The RF separators produce a final product of target material containing little, if any, secondary material.

Figure 1:
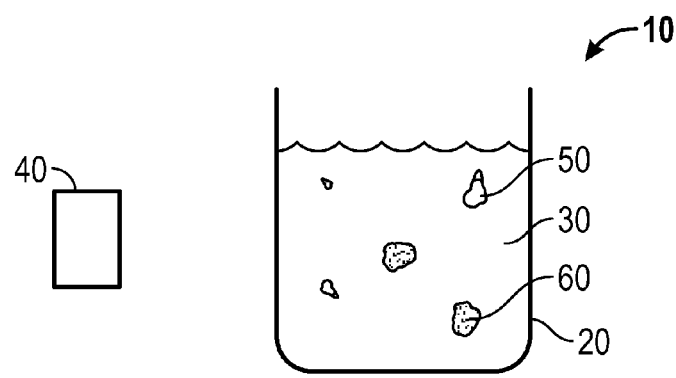
FIG. 1 is a schematic view of a generator and fluid in a RF particle separator.
Figure 2:
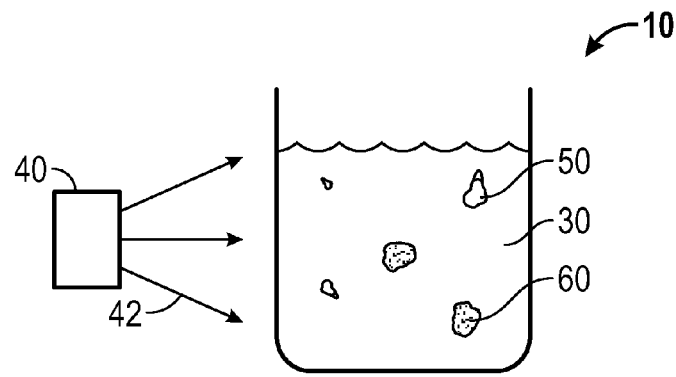
FIG. 2 is a schematic view of a generator operating upon a fluid in a RF particle separator.

Referring to the exemplary embodiment shown in FIGS. 1-2, a particle extractor is shown as radiofrequency (RF) particle separator 10. RF particle separator 10 extracts materials without relying on filtering or chemicals traditionally associated with frothing. RF particle separator 10 may further eliminate the need for subsequent panning. As shown in FIGS. 1-2, RF particle separator includes a reservoir, shown as basin 20. Basin 20 provides a support structure for various components of RF particle separator 10. Basin 20 is generally concave shaped, but basin 20 may have a variety of different shapes. According to an exemplary embodiment, basin 20 may be one meter wide, one meter deep, and ten meters long. According to an exemplary embodiment, basin 20 is manufactured by removing a portion of ground material. In this form, basin 20 may include a liner material to facilitate retaining fluids within basin 20 and have dimensions of one hundred meters wide, three meters deep, and one hundred meters long. According to an alternative embodiment, basin 20 is formed from metal, composite, or wood. According to another alternative embodiment, basin 20 is formed from still other suitable materials.

Referring again to the exemplary embodiment shown in FIGS. 1-2, RF particle separator 10 may include a carrier fluid, shown as fluid 30. Fluid 30 facilitates the extraction process of RF particle separator 10. Fluid 30 may include a non-homogeneous mixture of different constituents, a homogeneous mixture of different constituents, or may include only a single fluid constituent. According to an exemplary embodiment, fluid 30 may comprise a dielectric fluid (e.g., pure water, water that includes secondary materials, glycerine, furfural, ethylene glycol, alcohol, solutions of such fluids, etc.). As shown in FIGS. 1-2, fluid 30 is located within basin 20. Fluid 30 may partially or entirely fill basin 20 as the demands of RF particle separator 10 require. According to an exemplary embodiment, fluid 30 is a liquid. According to an exemplary embodiment, fluid 30 is liquid water. According to an alternative embodiment, fluid 30 is an alcohol, acetone, or another liquid selected to facilitate the extraction process of RF particle separator 10.

Referring again to the exemplary embodiment shown in FIGS. 1-2, RF particle separator 10 includes a material of interest, shown as target particles 50. As shown in FIGS. 1-2, target particles 50 may be located within fluid 30. Target particles 50 may be any material to be separated from fluid 30. Target particles 50 may include valuable minerals. Such valuable minerals may constitute the entire target particle 50, or target particle 50 may include a valuable mineral and a less valuable material (e.g., gangue). According to an exemplary embodiment, target particles 50 may comprise valuable metals such as gold, silver, or platinum, among other valuable metals. According to an alternative embodiment, target particles 50 may comprise less valuable metals such as iron, copper, and aluminum, among other less valuable metals. Target particles 50 include a specified size. The size of target particles 50 may vary based on the nature of previous processing steps. According to an exemplary embodiment, the size of target particles 50 is between approximately 0.1 micrometers to 1.0 millimeters. As shown in FIGS. 1-2, target particles 50 may be suspended within fluid 30. According to various alternative embodiments, target particles 50 may be located along the bottom of fluid 30 within basin 20, along a side of fluid 30 within basin 20, or randomly oriented within fluid 30.

According to the exemplary embodiment shown in FIGS. 1-2, RF particle separator 10 may include target particles 50 and extraneous materials, shown as secondary particles 60. Such secondary particles 60 may not rise within fluid 30 to the same extent as target particles 50 once affected by field 42. As shown in FIGS. 1-2, secondary particles 60 may be located within fluid 30. According to an exemplary embodiment, secondary particles 60 include any material within fluid 30 other than target particles 50 (e.g. carbon compounds, less valuable materials, etc.). The composition of such secondary particles 60 may include aggregate, processing chemicals, and materials having a value less than the target particles 50. The size and shape of secondary particles vary widely. According to an exemplary embodiment, the size of secondary particles 60 is between approximately 0.1 micrometers to 1.0 millimeters. As shown in FIGS. 1-2, secondary particles 60 may be suspended within fluid 30. According to various alternative embodiments, secondary particles 60 may be located along the bottom of fluid 30 within basin 20, along a side of fluid 30 within basin 20, or randomly oriented within fluid 30.

According to the exemplary embodiment shown in FIGS. 1-2, the material properties of target particles 50 and secondary particles 60 vary depending on the nature of their composition. According to an exemplary embodiment, the density of target particles 50 is greater than the density of fluid 30. Such target particles 50 may nonetheless remain suspended within fluid 30 due to various flow currents within fluid 30, among other reasons. Flow currents within fluid 30 may occur due to a physical or thermal movement of fluid 30 within basin 20. According to an alternative embodiment, the density of target particles 50 is approximately equal to the density of fluid 30. According to still another alternative embodiment, the density of target particles 50 is less than the density of fluid 30. Such target particles 50 may nonetheless remain suspended within fluid 30 or sink within fluid 30 due to various flow currents within fluid 30 or the presence of secondary particles 60. By way of example, secondary particles 60 having a greater density than that of target particles 50 may be attached to target particles 50 and force them to suspend or sink within fluid 30. The density of secondary particles 60 may similarly be less than, equal to, or greater than the density of fluid 30.

Referring again to the exemplary embodiment shown in FIGS. 1-2, RF particle separator 10 includes a wave creation device, shown as generator 40. Generator 40 is configured to subject fluid 30 to a pattern of waves, shown as field 42 having specified characteristics. According to an exemplary embodiment, generator 40 is a wave form generator capable of exposing fluid 30 to electromagnetic waves having identified properties. Such identified properties may include frequency, intensity, uniformity, direction, polarization, mode shape, and pulse length, among other known properties of electromagnetic waves. The wave form may include a plurality of electromagnetic waves having different properties. The plurality of electromagnetic waves may overlap in space, in time, or both in space and in time. Identifying certain properties of field 42 provides greater control of the extraction process of RF particle separator 10.

According to various alternative embodiments, generator 40 subjects fluid 30 to a continuous or pulsed field. The electromagnetic field within the separator may be a standing wave or a non-propagating evanescent field. Such fields may have a modal character dominated either by an electric field component (varying at an RF frequency) or a electromagnetic field component (varying at an RF frequency). According to an alternative embodiment, generator 40 produces a continuous electric field component. According to still another alternative embodiment, generator 40 subjects fluid 30 to a electromagnetic field component. Such electromagnetic field may be a continuous electromagnetic field. According to an alternative embodiment, the electromagnetic field is a pulsed electromagnetic field. Varying the type of field 42 generated by generator 40 allows for greater control of the extraction process undertaken by RF particle separator 10. By way of example, field 42 may be selected as having a predominately magnetic field characteristic in order to extract target particles having naturally occurring or introduced magnetic characteristics.

According to the exemplary embodiment shown in FIG. 2, generator 40 may direct field 42 toward fluid 30. The distance, relative orientation, and presence of intervening objects between generator 40 and fluid 30 impact the intensity of the field that affects fluid 30. According to the exemplary embodiment shown in FIGS. 1-2, generator 40 is located on a side of basin 20. It should be understood that generator 40 may be located in any position with respect to fluid 30, including within fluid 30. According to the exemplary embodiment shown in FIG. 2, field 42 passes through basin 20 and into fluid 30. According to another alternative embodiment, generator 40 is positioned to allow field 42 to flow directly into fluid 30.

Figure 3:
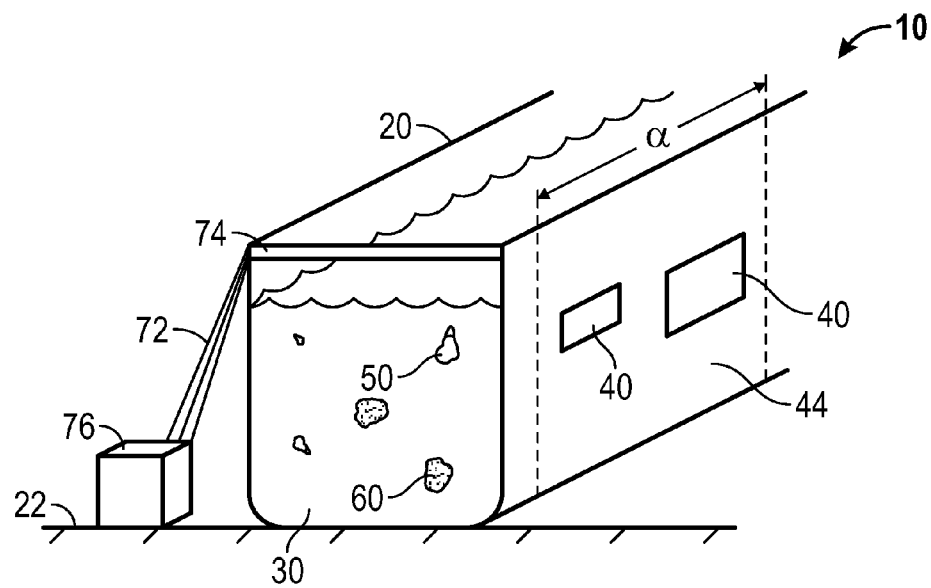
FIG. 3 is a schematic view of a generator operating upon a fluid within a chute.

Referring next to the alternative embodiment shown in FIG. 3, RF particle separator 10 may interact with fluid 30. Fluid 30 facilitates the extraction process of RF particle separator 10 shown in FIG. 3. Fluid 30 may include various properties as discussed above. According to an exemplary embodiment, RF particle separator 10 includes target particles 50. Target particles 50 may comprise valuable or less valuable materials as discussed above. As discussed above, target particles 50 may be located within fluid 30 in various configurations. According to an alternative embodiment, RF particle separator 10 further includes secondary particles 60. Secondary particles 60 may be any material of various sizes within fluid 30, as discussed above, and secondary particles 60 may be located within fluid 30 in various configurations.

According to the alternative embodiment shown in FIG. 3, RF particle separator 10 further includes a transport structure, shown as chute 70. Chute 70 provides a support structure for various components of RF particle separator 10. According to an exemplary embodiment, chute 70 is generally concave shaped, but it should be understood that chute 70 may have a variety of different shapes. According to an exemplary embodiment, chute 70 is manufactured by removing a portion of ground material. In this form, chute 70 may include a liner material to facilitate retaining fluids within chute 70 and prevent fluid 30 from seeping into the ground. According to an alternative embodiment, chute 70 is formed from a metal, composite, or wood. According to another alternative embodiment, chute 70 is formed from still other suitable materials.

According to the alternative embodiment shown in FIG. 3, chute 70 at least partially contains fluid 30. Such containment may include chute 70 entirely surrounding fluid 30. Fluid 30 may experience a pressurized state, depressurized state, or both depending on the operating conditions of RF particle separator 10. According to an exemplary embodiment, fluid 30 flows within chute 70 at a specified flow rate. The flow rate of fluid 30 may be specified according to maximize the extraction process of RF particle separator 10. According to an exemplary embodiment, fluid 30 flows within chute 70 due to gravity. Such flow may occur where a first end of chute 70 is located at a greater elevation than a second end of chute 70. According to an alternative embodiment, fluid 30 flows within 70 due to a mechanical input. Such mechanical input may include a pump that moves fluid 30 within chute 70 at a specified flow rate. According to still another alternative embodiment, fluid 30 does not flow within chute 70.

According to an alternative embodiment shown in FIG. 3, chute 70 may interact with additional processing equipment. Such processing equipment may include milling machines, rock crushers, fluid supplies, and fluid runoff chutes. According to an exemplary embodiment, chute 70 interacts with a fluid supply that provides unprocessed fluid 30 containing target particles 50 into chute 70 for extraction by RF particle separator 10. According to an alternative embodiment, chute 70 is separated from other processing equipment.

Referring again to the alternative embodiment shown in FIG. 3, RF particle separator 10 further includes a generator 40. Generator 40 subjects fluid 30 to a field as discussed above. The number and orientation of generators 40 may be selected based on an operating condition of RF particle separator 10 or fluid 30. According to the alternative embodiment shown in FIG. 3, RF particle separator 10 includes a plurality of generators 40 spaced at a specified interval along chute 70 (e.g., every 1 meter, every 10 meters, etc.). The position of generators 40 may be selected in order to facilitate subjecting fluid 30 to a field. According to an exemplary embodiment, generators 40 may be disposed along a side of chute 70. According to various alternative embodiments, generators 40 may be located above, below, within, or on top of fluid 30.

Referring still to the alternative embodiment shown in FIG. 3, with the generators 40 engaged, fluid 30 is subjected to a field thereby forming a target zone, shown as subjected portion 44. Subjected portion 44 is a portion of chute 70 where fluid 30 is subjected to a field from generators 40. According to an exemplary embodiment, subjected portion 44 extends entirely across chute 70 perpendicular to the flow of fluid 30 such that it entirely covers the cross-section of chute 70. As shown in FIG. 3, subjected portion 44 is at least partially defined by a length a along chute 70. According to various alternative embodiments, subjected portion 44 extends radially, spherically, or according to another defined shape with respect to generators 40.

Referring again to the exemplary embodiment shown in FIG. 3, RF particle separator 10 may further include an accumulator, shown as recovery system 72. Recovery system 72 collects target particles 50 after they are separated from fluid 30. According to an exemplary embodiment, recovery system 72 may be at least partially coupled to chute 70. According to an alternative embodiment, recovery system 72 may be located proximate to an external structure, shown as ground surface 22, the top surface of fluid 30, or within fluid 30. According to the exemplary embodiment shown in FIG. 3, recovery system 72 may include a strainer, shown as skimmer 74. Skimmer 74 may be located proximate to the top surface of fluid 30. Skimmer 74 collects target particles 50 located along the top surface of fluid 30. This collection occurs through contact between target particles 50 and skimmer 74. Target particles 50 move to the edge of chute 70. As shown in FIG. 3, recovery system 72 further includes a collection point, shown as catch 76. Target particles 50 collected by skimmer 74 may be moved to catch 76 for removal.

Referring again to the exemplary embodiment shown in FIG. 2, target particles 50 within fluid 30 may be subjected to electromagnetic field 42 created by generator 40. According to an exemplary embodiment, field 42 has a predominantly electric field character. Such electric fields include continuous fields and pulsed electric fields. Field 42 interacts with target particle 50 and increases the temperature of target particle 50. According to an exemplary embodiment, the temperature is increased uniformly throughout the volume of target particle 50. The heating depends on the conductivity of target particles 50 multiplied by the electric field strength squared, which may be a magnetically induced field and vary according to the rate of magnetic flux density change squared (i.e., a higher frequency is better at inducing an electric field strength value). According to an exemplary embodiment, the target particle 50 may comprise a dielectric mineral that is lossy (i.e. that has a high dielectric loss tangent). Dielectric heating within such minerals may be due to rotation of polar molecules and may vary according to the product of frequency and electric field strength squared. According to an alternative embodiment, target particle 50 may comprise a magnetic material (e.g., a ferromagnetic) that exhibits hysteresis. Magnetic heating within such minerals may be due to variation in magnetic domains and may vary according to the product of frequency and electromagnetic field strength squared.

Figure 4:
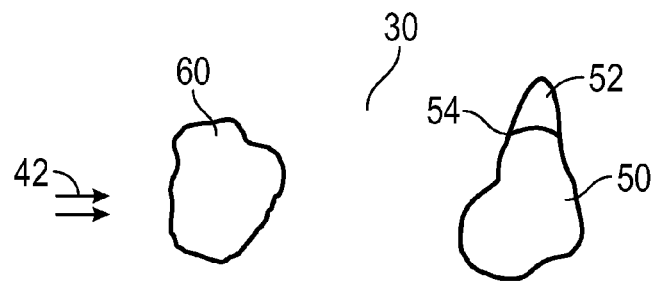
FIG. 4 is a schematic view of a target and secondary particle affected by a field.
Figure 5:
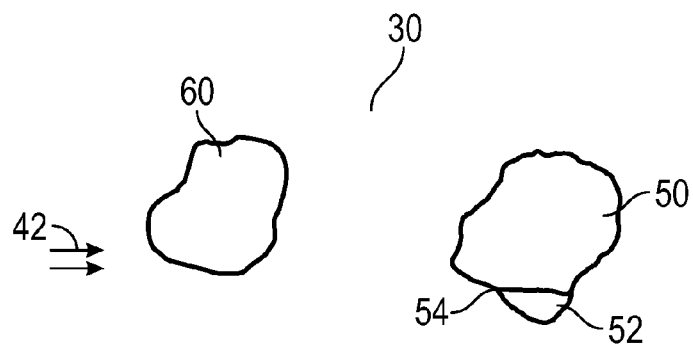
FIG. 5 is a schematic view of a target and secondary particle affected by a field.

As shown in FIGS. 4-5, target particle 50 transfers heat into fluid 30 until at least a portion of fluid 30 is vaporized. Vaporizing fluid 30 forms a vapor pocket, shown as bubble 52 that is coupled to target particle 50 by an interface, shown as contact surface 54. Contact surface 54 couples bubble 52 to particle 50 through surface tension. This coupling may depend on the wettability of the particle by the liquid fluid. By way of example, vapor bubbles may couple more strongly to particles having a low liquid wettability. According to the exemplary embodiment shown in FIGS. 4-5, the density of bubble 52 is lower than the density of fluid 30. This difference in density between bubble 52 and fluid 30 causes bubble 52 to lift target particle 50 within fluid 30. As shown in FIGS. 4-5, the temperature of secondary particle 60 is not increased sufficiently to vaporize fluid 30. This disparity in temperatures and corresponding variation in attached bubbles 52 separates target particles 50 from fluid 30 and most secondary particles 60.

Referring again to the exemplary embodiment shown in FIGS. 4-5, bubble 52 forms along contact surface 54 of target particle 50. The location of bubble 52 on target particle 50 may be governed by a number of factors, including the shape, size, and material properties of target particle 50, among other factors. According to the exemplary embodiment shown in FIG. 4, bubble 52 forms along an upper portion of target particle 50. In this configuration, bubble 52 pulls target particle 50 upwards to the surface of fluid 30. The lifting force provided by bubble 52 is transferred to target particle 50 through contact surface 54 and causes target particle 50 to rise. According to the alternative embodiment shown in FIG. 5, bubble 52 is located along a lower portion of target particle 50. In this configuration, bubble 52 pushes target particle 50 upwards to the surface of fluid 30, and the upper portion of target particle 50 may contact another bubble 52 such that it does not further vaporize fluid 30.

Figure 6:
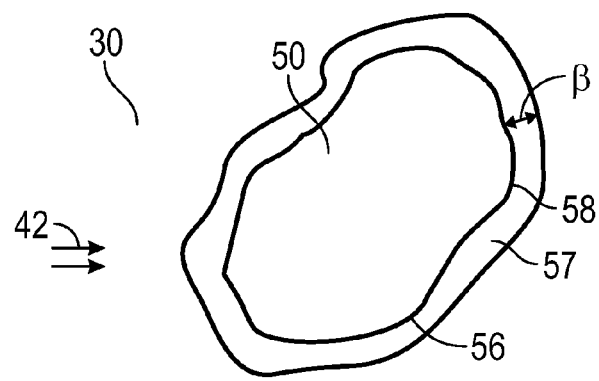
FIG. 6 is a schematic view of a target particle affected by a field and heated to a specified skin depth.

Referring next to the alternative embodiment shown in FIG. 6, field 42 increases the temperature of target particle 50 non-uniformly. Field 42 may interact with target particle 50 and first increase the temperature of an outer portion, shown as outer surface 56. As further interaction occurs, an affected zone, shown as subjected portion 57 of target particle 50 extends from outer surface 56 inward to an inner boundary, shown as inner temperature line 58. Subjected portion 57 may include the portion of target particle 50 having an increased temperature. Within subjected portion 57, the temperature varies from a higher temperature at outer surface 56 to a lower temperature at inner temperature line 58. The remaining portion of target particle 50 remains an initial temperature. The distance between outer surface 56 and inner temperature line 58 is an affected distance, shown as skin depth β in FIG. 6.

Referring again to the exemplary embodiment shown in FIG. 6, non-uniformly increasing the temperature of target particle efficiently facilitates the separation process of the RF particle separator. According to an exemplary embodiment, the diameter of target particles 50 is approximately 0.001 meters. With particles of this size, increasing the temperature of subjected portion 57 of target particle 50 may provide greater efficiency in part because of the energy savings caused by increasing the temperature of only part of target particle 50. Efficiency is further promoted because the temperature of subjected portion 57 may be increased more quickly than a uniform increase of the entire target particle 50. This faster increase in temperature may reduce the requisite operation time for the field generator and allows the RF particle separator to remove more target particles in an equal duration of time.

According to various exemplary embodiments, field 42 includes electromagnetic waves having a frequency and amplitude. Varying the frequency of the electromagnetic waves emitted by generator 40 varies skin depth β. According to an exemplary embodiment, skin depth β is inversely proportional to the square root of the frequency of the electromagnetic waves. By way of example, a higher frequency tends to decrease the skin depth β whereas a lower frequency tends to increase the skin depth β. According to an exemplary embodiment, skin depth β is approximately ten percent of the diameter of the target particles 50. According to an alternative embodiment, the skin depth is increased until subjected portion 57 extends throughout target particle. In both instances, the efficiency of RF particle separator 10 is increased relative to embodiments where the skin depth is substantially larger than the size of the particle (or its mineral portion). The skin depth impacts the size of particles moved by RF particle separator 10. The frequency of field 42 may then be varied in order to remove different sized particles with each applied frequency. According to an exemplary embodiment, the frequency of the field is increased or decreased according to a specified pattern thereby allowing for the extraction of certain sized particles.

Figure 7:
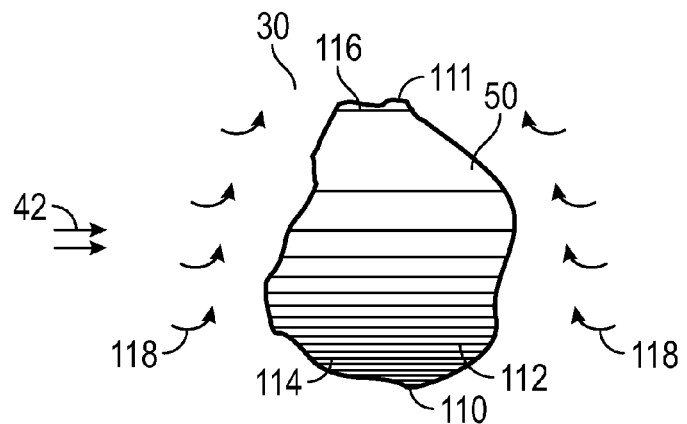
FIG. 7 is a schematic view of a target particle affected by a field and heated to a specified temperature gradient.

Referring next to the alternative embodiment shown in FIG. 7, target particles 50 may be extracted from fluid 30 without vaporizing fluid 30. As shown in FIG. 7, field 42 increases the temperature of target particle 50 according to a specified pattern, shown as thermal gradient 112. According to an exemplary embodiment, field 42 includes electromagnetic waves having a frequency, amplitude, and other characteristics.

According to an exemplary embodiment, the frequency of the electromagnetic waves within field 42 varies. Such variance may occur in a single linear dimension (e.g., vertically, laterally, along a depth, etc.), a single curvilinear dimension, two dimensions formed by two of the foregoing linear or curvilinear dimensions, spherically, or according to some other one, two, or three dimensional geometry. According to an alternative embodiment, the amplitude of the electromagnetic waves within the field varies. According various other alternative embodiments, still other characteristics of the field vary.

According to the exemplary embodiment shown in FIG. 7, target particles 50 within fluid 30 interact with field 42. Variance among the electromagnetic waves within field 42 provides a non-uniform temperature increase within target particles 50. According to the exemplary embodiment shown in FIG. 7, the frequency or amplitude of electromagnetic waves of field 42 varies across the particles, and heating due to electromagnetic waves acting on the bottom 110 of target particle 50 may be greater than the heating due to electromagnetic waves acting on the top 111 of target particle 50. This variance in heating results in thermal gradient 112 within target particle 50. As discussed above, thermal gradient 112 is related to the variance in characteristics of field 42. The material properties of target particles 50 (e.g., density, thermal conductivity, presence of trace materials, etc.) may impact the degree that thermal gradient 112 corresponds to the variance within the electromagnetic waves of field 42.

Referring again to the exemplary embodiment shown in FIG. 7, field 42 interacts with target particle 50 to increase the temperature of target particle 50. The temperature is increased to a first specified level, shown as first temperature 114 at a location proximate to the bottom of target particle 50 and a second specified level, shown as second temperature 116 at a location proximate to the top of target particle 50. According to an exemplary embodiment, first temperature 114 is higher than second temperature 116. While the entire target particle 50 transfers heat to fluid 30, portions of target particle 50 having a proportionally higher temperature transfer proportionally more heat to the surrounding fluid 30. According to an alternative embodiment, field 42 creates thermal gradient 112 having lateral characteristics such that target particle 50 moves laterally within fluid 30.

Referring still to the exemplary embodiments shown in FIG. 7, the additional heat transfer proximate to certain portions of target particle 50 causes a greater increase in the temperature of fluid 30 along to the bottom of target particle 50 than the fluid 30 along to the top of target particle 50. The warmer fluid 30 proximate to the bottom of target particle 50 expands and rises toward the surface of fluid 30. This rising fluid 30 causes a thermal influx, shown as propulsion currents 118. Propulsion currents 118 interact with the surface of target particles 50 to provide a lifting force. According to an alternative embodiment, field 42 causes different thermal gradients 112 within target particles 50. These varying thermal gradients 112 cause unique heat transfer between target particles 50 and fluid 30 and provide for different movement of target particles 50.

Figure 8:
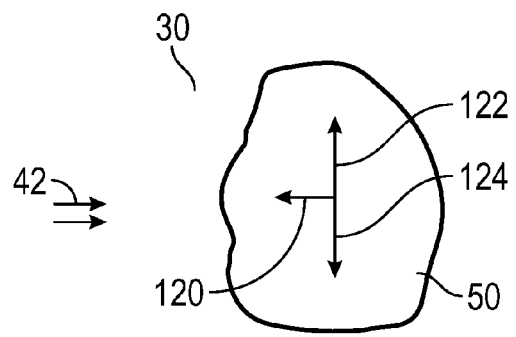
FIG. 8 is a schematic view of a target particle affected by a field and including an induced force component.

Referring next to still another alternative embodiment shown in FIG. 8, target particles 50 may be moved through magnetic interaction. According to an exemplary embodiment, target particles 50 may comprise a conductive material capable of carrying an electric current. Field 42 created by generator 40 may interact with target particles 50 along a specified direction, shown as field vector 120. Field vector 120 may cause eddy currents to form and circulate within target particles 50 perpendicular to field vector 120. These eddy currents may travel throughout or only within a certain volume of target particles 50. Flow of electrons along the electrical circuit may induce a voltage and electromagnetic field within target particles 50. This electromagnetic field may combine with field 42 having a specified gradient and interact with the current to produce a J×B force, shown as force vector 122 having a magnitude and a direction. The magnitude of force vector 122 moves target particles 50 along the direction of force vector 122. Such movement of target particles 50 through fluid 30 caused by force vector 122 is less dependent on the characteristics of fluid 30 than alternative methods such as vaporizing fluid 30.

Referring again to the exemplary embodiment shown in FIG. 8, several factors impact the magnitude of force vector 122. By way of example, the magnitude of waves within field 42 and the conductance of target particles 50, among other factors, impact the magnitude of force vector 122. According to an exemplary embodiment, target particles 50 may be highly conductive materials (gold, silver, copper, etc.). Highly conductive materials allow field 42 to induce stronger eddy currents within target particles 50 and may increase the magnitude of force vector 122. A stronger induction of eddy currents within target particles 50 may further facilitate the separation operation of RF particle separator 10 because secondary particles 60 may be a material not suitable to carrying eddy currents or may be a material less suitable to carrying eddy currents than target particles 50. By way of example, aggregate material may be not well suited to carrying eddy currents. Aggregates failing to carry sufficient eddy currents will not move substantially in the direction of force vector 122. Target particles 50 may be better at carrying eddy currents than secondary particles 60 and may move in the direction of force vector 122 while the secondary particles 60 may not.

According to an alternative embodiment, the target particles may have a conductance lower than highly conductive materials but greater than the secondary particles (e.g., titanium, platinum, etc.). As discussed above, the strength of the field may also impact the magnitude of a force vector. The strength of the field may be controlled in order to induce eddy currents within the target particles that create a sufficient magnitude of a force vector. According to an exemplary embodiment, the magnitude of a force vector may be sufficient where it is capable of moving the target particles along a specified path.

According to an alternative embodiment, the strength of the field may be further increased in order to create a force vector having a magnitude capable of moving the target particles faster or slower, as conditions may require. By way of example, a larger force may be necessary where the fluid is flowing rapidly or where the target particles must be extracted from the fluid quickly. Under these circumstances, the requisite force vector may have a magnitude much greater than the weight force of the target particle. According to an exemplary embodiment, the strength of the field is controlled to induce a force vector capable of moving the target particles without substantially moving the secondary particles.

According to an alternative embodiment, the target particles may have magnetic properties apart from those paramagnetically induced by a field. Such magnetic properties may have been introduced to target particles or naturally occurring within the target particles. The magnetic properties may be induced by the field but be nonlinear and dependent upon the amplitude or frequency of the field. Ferrous materials may be particularly susceptible to such properties. According to an exemplary embodiment, the target particles may be iron having naturally occurring magnetic properties. According to an alternative embodiment, target particles may be iron having introduced magnetic properties. The introduction of magnetic properties may occur through various known techniques including introducing the target particles to a magnetic material or an electromagnet. Naturally occurring or introduced magnetic properties of the target particles further interact with the applied electromagnetic field and create a larger force than similar target particles exposed to a similar electromagnetic field.

According to an alternative embodiment, the target particles may be charged. Charged target particles interact with an electromagnetic field and experience a Lorentz force acting to move the particle. Electromagnetic fields include an electric field portion, E and a electromagnetic field portion, B. For a particle having a given electric charge, q, the force acting to move the particle is the charge q multiplied by the applied electric field and the cross product of the velocity of the particle and the applied electromagnetic field. The cross product causes the Lorentz force to act perpendicular to both the velocity with applied electromagnetic field. According to an exemplary embodiment, the target particles may be naturally charged. According to an alternative embodiment, the target particles may be charged prior to entering the field. Such charging may occur or according to various known methods, including electrostatically charging the target particles or creating ions by exposing the target particles to a chemical compound.

Figure 9:
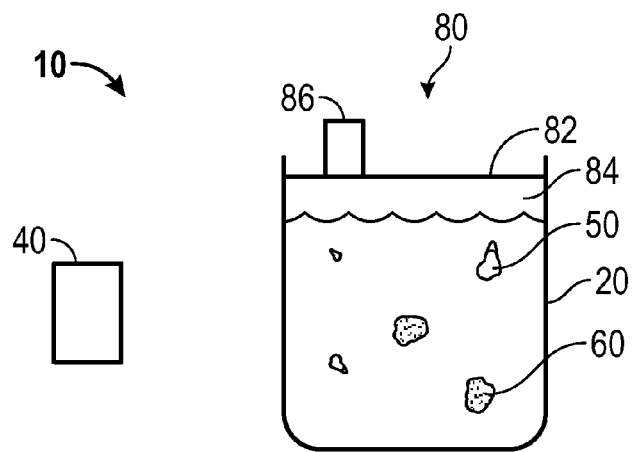
FIG. 9 is a schematic view of an RF particle separator having a characteristic altering system.
Figure 10:
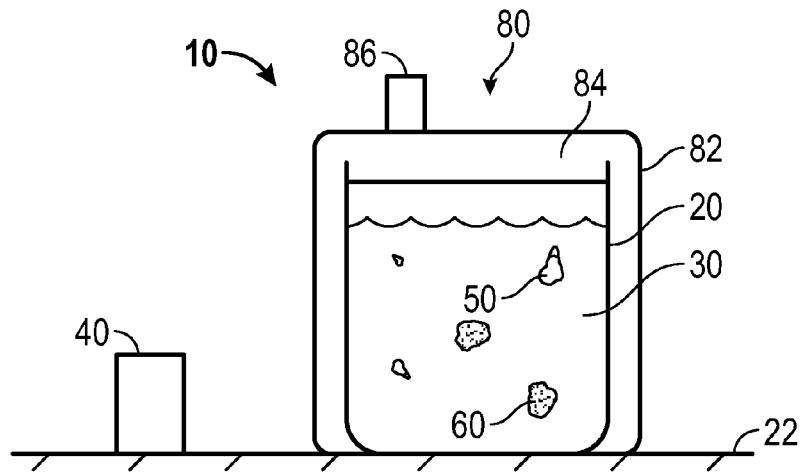
FIG. 10 is a schematic view of an RF particle separator having a characteristic altering system.

Referring next to the exemplary embodiment shown in FIGS. 9-10, RF particle separator 10 may further include a fluid characteristic regulator, shown as conditioner system 80. Conditioner system 80 may decrease the air pressure above fluid 30 in order to facilitate the size or formation rate of bubbles 52 within fluid 30. According to the exemplary embodiment shown in FIGS. 9-10, conditioner system 80 may further include a cover, shown as housing 82. Housing 82 may include an inside portion and an outside portion and partially or entirely surround fluid 30 thereby sealing fluid 30 from external atmospheric pressure conditions.

According to the exemplary embodiment shown in FIG. 9, housing 82 may be disc shaped and coupled to a surface of basin 20. Such coupling may be accomplished according to any known technique including welding, a bolted connection, using an adhesive, or other known coupling techniques. According to the alternative embodiment shown in FIG. 10, housing 82 is partially coupled to ground surface 22. Such coupling may occur by burying a portion of housing 82 within ground surface 22, by using seal connection, or by various alternative known methods.

According to the exemplary embodiment shown in FIGS. 9-10, conditioner system 80 may further include a volume, shown as zone 84. Zone 84 is formed between the surface of fluid 30 and the inside portion of housing 82. According to an exemplary embodiment, zone 84 may be filled with a fluid and substantially sealed from external atmospheric conditions. Such a fluid may include air, argon gas, or another known fluid capable of facilitating to the formation of bubbles 52 within fluid 30. Sealing zone 84 may provide at least the benefit of allowing for the regulation of certain fluid conditions within zone 84. Such certain fluid conditions may include temperature, pressure, among other known conditions of the fluid within zone 84.

According to the exemplary embodiment shown in FIGS. 9-10, zone 84 is in fluid communication with fluid 30. As shown in FIGS. 9-10, the fluid pressure within zone 84 acts on fluid 30 and inhibits the formation of bubbles 52. Further, the heat energy of the fluid within zone 84 may be absorbed by fluid 30 or the fluid within zone 84 may absorb heat energy from fluid 30. According to various alternative embodiments, additional characteristics of the fluid within zone 84 impact characteristics of fluid 30.

According to the exemplary embodiment shown in FIG. 9, conditioner system 80 includes a pressure regulating device, shown as pump 86. According to the exemplary embodiment shown in FIG. 9, pump 86 may be coupled to housing 82. According to an alternative embodiment, pump 86 may be coupled to basin 20. Varying the coupling location of pump 86 may vary a pressure profile across zone 84 whereby the pressure above one portion of fluid 30 may be greater or lower than the pressure above a different portion of fluid 30. According to an exemplary embodiment, conditioner system 80 further includes one or more diffusers that allow pump 86 to more uniformly increase or decrease the pressure within zone 84.

According to the exemplary embodiment shown in FIG. 9, pump 86 is configured to decrease the pressure of the fluid within zone 84 relative to the atmospheric conditions outside housing 82. Reducing the pressure of the fluid within zone 84 provides at least the benefit of changing the force acting upon fluid 30 by the fluid within zone 84. As discussed above, this force acting upon fluid 30 resists the formation of bubbles 52. Reducing the force acting on fluid 30 allows bubbles 52 to form within fluid 30 more easily. According to an alternative embodiment, pump 86 is configured to increase the pressure of the fluid within zone 84 relative to the atmospheric pressure outside housing 82. Such an increase in pressure may be necessary in order to allow RF particle separator 10 to selectively remove target particles 50 from fluid 30 or prevent excessive vaporization of fluid 30.

Referring further to the exemplary embodiment shown in FIG. 9, the temperature of fluid 30 may be sufficiently high to vaporize fluid 30 under the surrounding atmospheric conditions. This effect may especially occur in areas of greater elevation where the atmospheric pressure is lower than at sea-level. Under such conditions, fluid 30 may begin to vaporize uncontrollably and cause RF particle separator 10 to extract both target particles 50 and secondary particles 60 from fluid 30. This plural extraction is not preferred in that a mixture may require further processing in order to separate target particles 50 from the extracted mixture of target particles 50 and secondary particles 60. According to an alternative embodiment, pump 86 may be configured to increase the pressure within zone 84 thereby preventing this uncontrolled vaporization condition.

According to various alternative embodiments, other conditions of the fluid within a zone surrounding the carrier fluid may be regulated. According to an exemplary embodiment, a conditioner system may include a temperature regulating device, such as a heater or air conditioner. A heater or air conditioner in fluid communication with the fluid surrounding the carrier fluid may be necessary in order to facilitate the extraction of target particles from the carrier fluid. By way of example, the temperature of the fluid surrounding the carrier fluid may be regulated in order to prevent the fluid containing target and secondary particles from changing state.

According to an alternative embodiment, the conditioner system may include an air conditioner that reduces the temperature of fluid surrounding the carrier fluid. As discussed above, the temperature of the carrier fluid under certain atmospheric conditions (e.g., low pressure, etc.) may lead to uncontrolled vaporization and cause the RF particle separator to extract both target and secondary particles. Uncontrolled vaporization may be avoided by increasing the pressure of the fluid acting on the carrier fluid. Such uncontrolled boiling may further be avoided by reducing the temperature of the fluid surrounding the carrier fluid thereby causing heat transfer from the carrier fluid into the surrounding fluid. An air conditioner or heat pump that reduces the temperature of a surrounding fluid may reduce the temperature of the carrier fluid until the uncontrolled vaporization condition (i.e. the maximum temperature of the carrier fluid before vaporization occurs at a given pressure) is no longer present.

According to an alternative embodiment, the conditioner system may include a heating element that increases the temperature of fluid surrounding the carrier fluid. An increased temperature of the surrounding fluid may increase the temperature of the carrier fluid through heat transfer from the surrounding fluid to the carrier fluid. Such an increase may be necessary in order to prevent the carrier fluid from freezing due to cold atmospheric conditions, for example. Preventing the carrier fluid from freezing provides at least the benefit of allowing bubbles to extract target particles from the carrier fluid. Should a portion of the carrier fluid freeze, bubbles will not lift target particles to the surface of the carrier fluid for separation. Separation may not be possible for at least the reason that a separator may not have physical access to the target particles due to physical separation by a frozen layer of carrier fluid. Separation may further not be possible due to frozen carrier fluid interfering with the operation of the separator in another way (i.e. preventing the movement of various components).

While the preceding discussion of the conditioner system included references to various components of RF particle separator 10 according to an exemplary embodiment shown in FIGS. 9-10, it should be understood that the conditioner system may be configured to interact with various alternative embodiments of the RF particle separator. Such alternative embodiments may include the RF particle separator shown in FIG. 3, among others. Still further orientations and configurations of the conditioner system may be possible and understood by an ordinary person in the relevant art.

Figure 11:
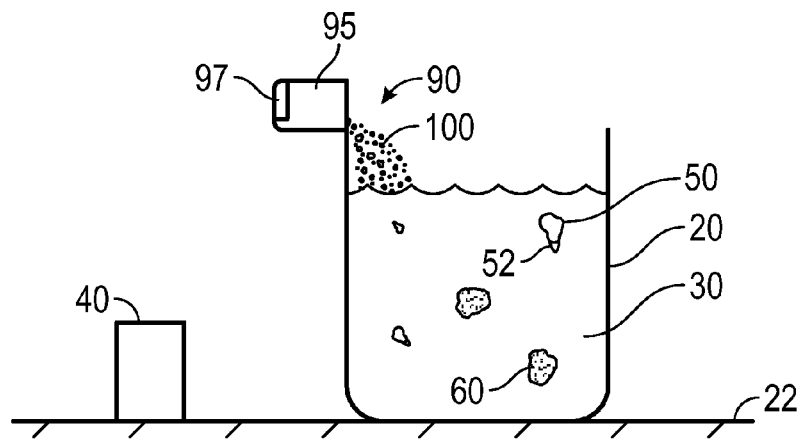
FIG. 11 is a schematic view of an RF particle separator having a dispenser system.

Referring next to the exemplary embodiment shown in FIG. 11, RF particle separator 10 may further include a fluid regulation system, shown as governor 90. Governor 90 may adjust a condition of fluid 30. According to the exemplary embodiment shown in FIG. 11, governor 90 may be coupled to an upper portion of basin 20 above fluid 30. According to various alternative embodiments, governor 90 may be coupled with another portion of basin 20 above fluid 30, coupled with basin 20 partially within fluid 30, or coupled with basin 20 entirely submerged within fluid 30. Such coupling may occur through a variety of known techniques (adhesive, bolted connection, snap fitting, etc.). According to still other alternative embodiments, governor 90 may be coupled to another portion of RF particle separator 10 or may float within or upon fluid 30.

According to the exemplary embodiment shown in FIG. 11, governor 90 may further include a substance capable of varying a property of fluid 30, shown as substance 100. Substance 100 may be a fluid or a solid capable of being dispensed in various ways. According to an exemplary embodiment, substance 100 is a liquid (e.g., acetone, etc.). Such liquid substance 100 may be sprayed, dropped, or otherwise infused into fluid 30. According to an alternative embodiment, substance 100 is a solid material. Such solid substance 100 may be introduced into fluid 30 as a singular amount of substance 100 or may be introduced into fluid 30 as multiple particles of substance 100. According to still another alternative embodiment, substance 100 is a gas. Gaseous substance 100 may dissolve within fluid 30 or may remain dissociated from fluid 30 to regulate a condition of fluid 30. Substances 100 may dissolve or mix within fluid 30 at a specified release rate. The release rate of substance 100 may be specified based on various conditions of fluid 30 including flow rate, temperature, and pressure, among other conditions of fluid 30 or the surrounding environment.

According to the exemplary embodiment shown in FIG. 11, substance 100 regulates the vapor pressure of fluid 30. Adjusting the vapor pressure of fluid 30 provides at least the benefit of facilitating or inhibiting the formation of bubbles 52 within fluid 30. Fluid 30 includes an initial vapor pressure before substance 100 is added. By way of example, the vapor pressure of pure water at twenty-five degrees Celsius is 0.03 atmospheres. This initial vapor pressure of may be increased or decreased as the conditions of fluid 30 demand. By way of example, the vapor pressure of fluid 30 may be increased to facilitate the formation of bubbles 52 or may be decreased to inhibit the formation of bubbles 52.

According to the alternative embodiment shown in FIG. 11, substance 100 regulates the surface tension of liquid fluid 30. The surface tension of fluid 30 is ability of the liquid fluid 30 to resist an external force caused by cohesion of similar molecules. Fluid 30 includes an initial surface tension before substance 100 is added. By way of example, the surface tension of pure water at twenty-five degrees Celsius is 71.97 dynes per cubic centimeter. This surface tension may be increased or decreased depending on the operating conditions of RF particle separator 10. By way of example, liquid fluid 30 may be water and substance 100 may be ethanol. The surface tension of a combination of water and forty percent ethanol by weight at twenty-five degrees Celsius is 29.63 dynes per cubic centimeter. According to an exemplary embodiment, substance 100 may increase the surface tension of fluid 30 to reduce the size and formation rate of bubbles 52 within fluid 30. According to an alternative embodiment, substance 100 may decrease the surface tension of fluid 30 to increase the size and formation rate of bubbles 52 within fluid 30.

According to the alternative embodiment shown in FIG. 11, the substance regulates the latent heat of fusion or the latent heat of vaporization of the carrier fluid. According to an exemplary embodiment, the substance may include a saline solution or crystalline salt. The carrier fluid having a saline solution or crystalline salt added may freeze at a lower temperature than an untreated carrier fluid and not experience the freezing issues discussed above. According to an alternative embodiment, the substance may cause the carrier fluid to vaporize at a different temperature than an untreated carrier fluid and prevent the uncontrolled vaporization issues discussed above.

Referring still to the exemplary embodiment shown in FIG. 11, governor 90 may further include a distributor, shown as dispenser 95. As shown in FIG. 11, dispenser 95 may be configured to facilitate the transmission of substance 100 into fluid 30. According to the exemplary embodiment shown in FIG. 11, dispenser 95 is coupled to basin 20 above a level of fluid 30. According to various alternative embodiments, dispenser 95 may be coupled to another component of RF particle separator 10 and may be disposed within fluid 30.

According to the exemplary embodiment shown in FIG. 11, the physical structure of dispenser 95 may be related to a characteristic of substance 100. As shown in FIG. 11, dispenser 95 may be an auger system capable of facilitating the transmission of a solid bead shaped substance 100 into fluid 30. Dispenser 95 may include a hopper configured to store substance 100 and a screw device that interacts with substance 100 and facilitate the transmission of substance 100 into fluid 30. Dispenser 95 may further include a mixer that facilitates creating a solution of substance 100 and fluid 30. While a specific configuration is disclosed, it should be understood that dispenser 95 may further include various additional components configured to manipulate substance 100 either prior to or after substance 100 is introduced into fluid 30.

According to an alternative embodiment, the dispenser may be a nozzle system capable of facilitating the transmission of a fluid substance into the carrier fluid. The dispenser may include a tank configured to store the fluid substance and a nozzle that regulates the flow of the fluid substance. The dispenser may further include a mixer that facilitates creating a solution of the fluid substance and carrier fluid. While a specific configuration is disclosed, it should be understood that the dispenser may further include various additional components configured to manipulate the substance either prior to or after the substance is introduced into the carrier fluid.

Referring still to the exemplary embodiment shown in FIG. 11, governor 90 may further include a substance manager, shown as controller 97. As shown in FIG. 11, controller 97 is configured to activate dispenser 95 in order to direct substance 100 into fluid 30. Controller 97 may include one or more processing circuits and memory devices configured to activate dispenser 95 in a specified manner. Such specified manner may include a continuous operation mode, a timer operation mode, or an as-needed operation mode.

According to the exemplary embodiment shown in FIG. 11, controller 97 further includes a sensor configured to monitor a condition of fluid 30. Controller 97 may then activate dispenser 95 in response to a received signal from the sensor in order to change a condition of fluid 30. By way of example, controller 97 may monitor the surface tension of fluid 30 either directly or indirectly and adjust the activation of dispenser 95 in order to change a condition of fluid 30. According to various alternative embodiments, controller 97 may adjust the activation of dispenser 95 in response to another received condition (e.g., the temperature or pressure, among other conditions, of the fluid within zone 84, the temperature and pressure, among other conditions, of the ambient environment, etc.).

According to an alternative embodiment, controller 97 may activate dispenser 95 in a timer mode according to a predetermined schedule. Timer mode operation may be appropriate where the conditions of fluid 30 vary predictably over time or do not substantially vary with time. Such timer mode operation provides at least the benefit of limiting the number of additional sensors or components needed to regularly activate dispenser 95. A predetermined schedule may be programmed by a user into controller 97 or may be calculated by controller 97. By way of example, a user may input a time duration of one minute into controller 97 thereby causing controller 97 to activate dispenser 95 once every minute.

According to still another alternative embodiment, controller 97 may activate dispenser 95 continuously. Such continuous operation may be necessary where the conditions of fluid 30 require a constant release of the regulating substance. By way of example, a constant release of the regulating substance may be necessary where the ambient temperature surrounding the carrier fluid is very low. As discussed above, these conditions may cause the carrier fluid to freeze and prevent effective separation of the target particles from the carrier fluid.

Figure 12:
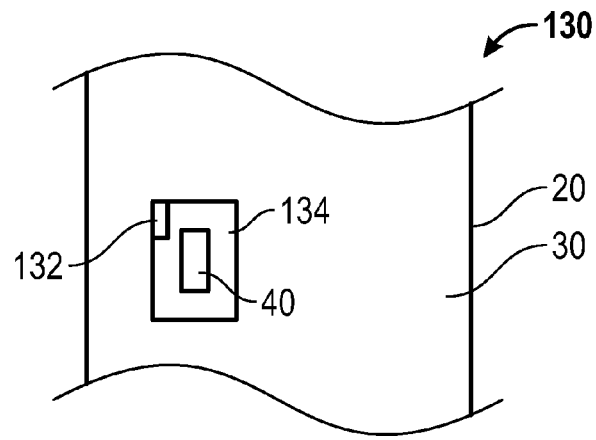
FIG. 12 is a schematic view of a mobile RF particle separator.

Referring next to the alternative embodiment shown in FIG. 12, RF particle separator 130 may be a mobile unit configured to extract target particles from fluid 30. As shown in FIG. 12, RF particle separator 130 includes a collector, shown as accumulator 132 and a support, shown as structure 134. According to an exemplary embodiment, structure 134 is generally flat and may float upon a portion of fluid 30 to facilitate the extraction operation of RF particle separator 130.

According to the exemplary embodiment shown in FIG. 12, RF particle separator 130 further includes generator 40. As discussed above, generator 40 is configured to subject fluid 30 to a field having specified characteristics. Such interaction causes target particles to rise as discussed above. According to an exemplary embodiment, generator 40 is a wave form generator capable of subjecting fluid 30 to an electromagnetic wave having identified properties (e.g., frequency, intensity, uniformity, direction, etc.). Identifying certain properties of the electromagnetic field provides greater control of the extraction process of RF particle separator 130.

Referring still to the exemplary embodiment shown in FIG. 12, RF particle separator 130 may include a collector, shown as accumulator 132. Accumulator 132 is configured to gather target particles 50 raised within fluid 30 by generator 40 and deposit them into a catch (not shown). According to an exemplary embodiment, accumulator 132 may include a skimmer that contacts fluid 30 and extracts target particles 50 from fluid 30. Such a skimmer may include a fixed blade design that moves within fluid 30 and contacts target particles 50. By way of example, an angled fixed blade design may cause target particles 50 to move along the blade and into the catch. According to an alternative embodiment, accumulator 132 may include a driven skimmer device that moves within fluid 30 independent of any movement of structure 134 within fluid 30. According to still another alternative embodiment, accumulator 132 includes a suction device capable of extracting target particles raised by generator 40 from fluid 30.

According to the exemplary embodiment shown in FIG. 12, RF particle separator 130 is configured to move with respect to fluid 30. Such movement may include drifting or driven motion within basin 20 along the surface of fluid 30. As RF particle separator 130 moves with respect to fluid 30, generator 40 subjects fluid 30 to a field that extracts target particles 50. The movement between RF particle separator 130 and fluid 30 may allow RF particle separator 130 having an extraction profile to extract target particles 50 from fluid 30 located within basin 20 having a size larger than the extraction profile of RF particle separator 130.

According to an exemplary embodiment, the carrier fluid flows within a basin along a specified path and RF particle separator 130 moves within a current generated by the carrier fluid. According to an alternative embodiment, RF particle separator 130 further includes a driving device configured to move RF particle separator 130 within the carrier fluid. Such movement may occur along the surface of the carrier fluid or may occur within the carrier fluid. RF particle separator 130 may further include a controller configured to regulate the movement of RF particle separator 130 within the carrier fluid. Such regulated movement may include a specified path or a random pattern having specified operation parameters.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An apparatus for separating a mineral from a liquid, comprising:
    a housing;
    a fluid comprising a liquid and including a mineral bearing particle, the fluid contained within the housing and defining a top surface;
    a generator configured to apply a radio-frequency electromagnetic field to the mineral bearing particle, wherein the radio-frequency electromagnetic field produces a temperature increase within a portion of the mineral bearing particle and the mineral bearing particle transfers heat into the fluid, the heated fluid imposing motion-inducing forces on the mineral bearing particle; and
    an accumulator positioned to separate the mineral bearing particle from the liquid, wherein the accumulator comprises a strainer configured to collect the mineral bearing particle through physical interaction therewith, the strainer disposed along the top surface of the liquid.

2. The apparatus of claim 1, wherein the transferred heat from the mineral bearing particle into the fluid forms a thermal current that lifts the mineral bearing particle.

3. The apparatus of claim 1, wherein the radio-frequency electromagnetic field includes a gradient and a field strength.

4. The apparatus of claim 1, further comprising a controller configured to vary a heating characteristic by adjusting a parameter.

5. The apparatus of claim 4, wherein the controller varies the heating characteristic based on a specified target unit size.

6. The apparatus of claim 4, wherein the controller varies the heating characteristic based on a specified target unit density.

7. The apparatus of claim 1, wherein the fluid comprises a dielectric fluid.

8. The apparatus of claim 1, wherein the radio-frequency electromagnetic field increases the temperature of the mineral bearing particle contained within the fluid to at or above a boiling point of the fluid, producing a plurality of vapor bubbles.

9. The apparatus of claim 8, wherein the mineral bearing particle transfers heat into the fluid uniformly.

10. The apparatus of claim 9, wherein the temperature of the mineral bearing particle is increased within a region defined by an outer surface of the mineral bearing particle and extending inward to a specified skin depth.

11. The apparatus of claim 10, wherein heat transferred from the mineral bearing particle boils the fluid, forming the plurality of vapor bubbles within the fluid at a formation rate.

12. The apparatus of claim 11, wherein the formation rate is controlled to move mineral bearing particle within the fluid at a specified speed.

13. The apparatus of claim 10, wherein the radio-frequency electromagnetic field includes a specified wave form.

14. The apparatus of claim 13, wherein the specified wave form is a continuous field having a specified frequency and intensity.

15. The apparatus of claim 13, wherein the specified wave form is a pulsed electromagnetic field.

16. The apparatus of claim 9, wherein the temperature of the mineral bearing particle is increased homogeneously.

17. The apparatus of claim 16, wherein the transferred heat from the mineral bearing particle boils the fluid forming the plurality of vapor bubbles within the fluid at a formation rate.

18. The apparatus of claim 8, wherein the mineral bearing particle transfers heat into the fluid according to a specified temperature gradient.

19. The apparatus of claim 18, wherein the transferred heat from the mineral bearing particle boils the fluid forming the plurality of vapor bubbles within the fluid at a formation rate.

20. The apparatus of claim 8, further comprising a controller configured to vary a heating characteristic by adjusting a parameter.

21. The apparatus of claim 20, wherein the controller varies the heating characteristic based on a specified target unit size.

22. The apparatus of claim 20, wherein the controller varies the heating characteristic based on a specified target unit density.

23. The apparatus of claim 22, wherein the heating characteristic is a size of the plurality of vapor bubbles.

24. The apparatus of claim 22, wherein the heating characteristic is a formation rate of the plurality of vapor bubbles.

25. The apparatus of claim 1, further comprising a surrounding fluid disposed adjacent to the fluid and a regulator configured to vary a condition of the surrounding fluid.

26. The apparatus of claim 25, wherein the regulator comprises a case partially surrounding the fluid and a pressure controller.

27. The apparatus of claim 26, the surrounding fluid having a pressure, wherein the pressure controller decreases the pressure of the surrounding fluid.

28. The apparatus of claim 1, wherein the accumulator comprises a catch positioned to receive the mineral bearing particle collected by the strainer.

29. The apparatus of claim 28, wherein the housing comprises a chute having a length, wherein the strainer comprises a fixed blade, and wherein the fixed blade is angularly offset relative to the length of the chute such that the mineral bearing particle moves along the fixed blade and into the catch.

30. An apparatus for separating a mineral bearing particle from a fluid, comprising:
a housing;
a fluid comprising a liquid and including a mineral bearing particle, the fluid contained within the housing and defining a top surface;
a generator configured to apply a non-uniform radio-frequency electromagnetic field to the mineral bearing particle, wherein the non-uniform radio-frequency electromagnetic field induces a propulsion force that moves the mineral bearing particle within the fluid; and
an accumulator positioned to separate the mineral bearing particle from the liquid, wherein the accumulator comprises a strainer configured to collect the mineral bearing particle through physical interaction therewith, the strainer disposed along the top surface of the liquid.

31. The apparatus of claim 30, wherein the non-uniform radio-frequency electromagnetic field induces currents within the mineral bearing particle and force is applied to the mineral bearing particle due to interaction of the currents and a magnetic component of the non-uniform radio-frequency electromagnetic field.

32. The apparatus of claim 31, wherein the propulsion force is generated by gradients in the force applied to the mineral bearing particle.

33. The apparatus of claim 30, wherein the non-uniform radio-frequency electromagnetic field includes a specified wave form.

34. The apparatus of claim 33, wherein the specified wave form comprises a continuous wave having a specified frequency and intensity.

35. The apparatus of claim 33, wherein the specified wave form is a pulsed electromagnetic field.

36. The apparatus of claim 30, wherein the accumulator comprises a catch positioned to receive the mineral bearing particle collected by the strainer.

37. The apparatus of claim 36, wherein the housing comprises a chute having a length, wherein the strainer comprises a fixed blade, and wherein the fixed blade is angularly offset relative to the length of the chute such that the mineral bearing particle moves along the fixed blade and into the catch.

* * * * *